M. Loomis,
Bellows,
N° 5,544.   Patented May 2, 1848.
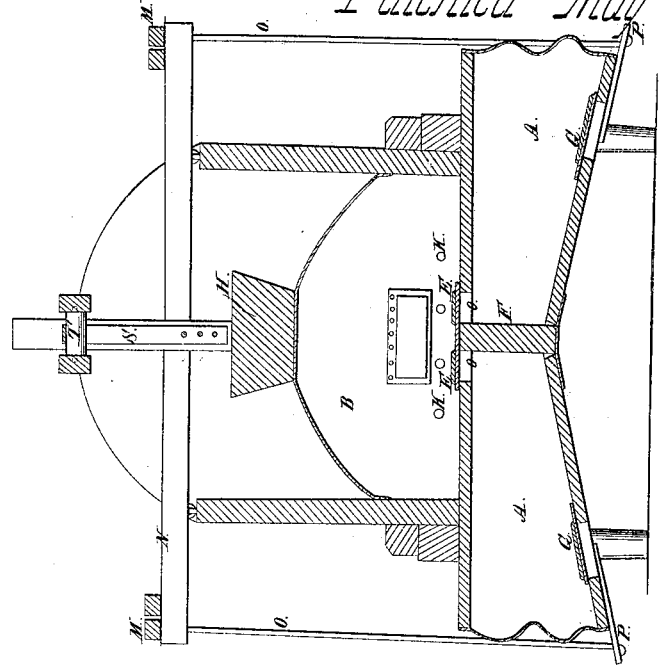
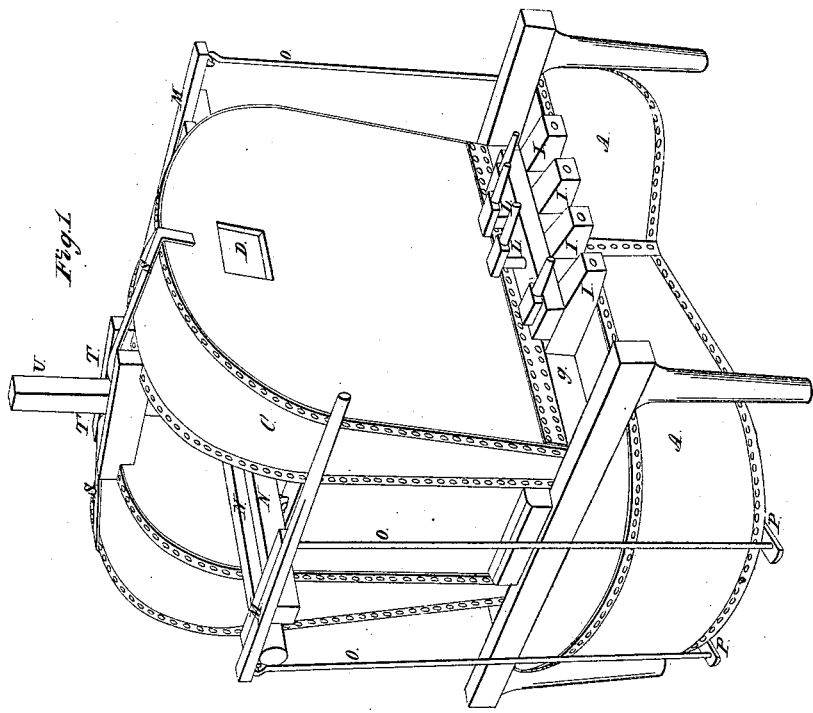

Sheet 2-2 Sheets
M. Loomis,
Bellows,
N° 5,544.
Patented May 2, 1848.
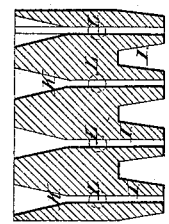
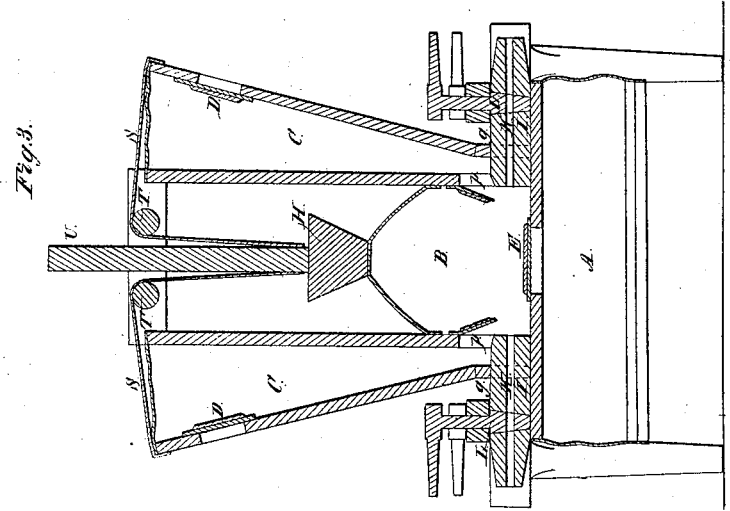

UNITED STATES PATENT OFFICE.

MORGAN LOOMIS, OF WORCESTER, NEW YORK.

SMITH'S BELLOWS.

Specification of Letters Patent No. 5,544, dated May 2, 1848.

*To all whom it may concern:*

Be it known that I, MORGAN LOOMIS, of Worcester, in the county of Otsego and State of New York, have invented a new and Improved Mode of Making Bellows Used by Blacksmiths and other Mechanics for Blowing Fires called "The Empire Bellows," which is described as follows, reference being had to the annexed drawings of the same, making part of this specification.

Figure 1 is a perspective view of the improved bellows. Fig. 2 is a vertical longitudinal section of ditto. Fig. 3 is a vertical transverse section of ditto. Fig. 4 is a horizontal section of the faucet pipes.

Similar letters in the figures refer to corresponding parts.

The nature of this invention consists in providing the upper part of the bellows, or wind chest, with two perpendicular bellows, or self-filling reservoirs, one on each side of said wind chest, and forming the sides of the same, the outside plank or part, being attached to the end of a leather strap, passing over pulleys T, immediately above the wind chest, and secured at its opposite end, to a vertical standard U connected to a weight fastened to the top of the wind chest, in such a manner, that the pressure of the wind from the lower bellows will fill the wind chest and raise the weight to the position represented in Fig. 2, of the drawing, and slacken the straps and allow the outside, or movable part of the upright bellows, to open outward by their own gravity, causing said bellows to become filled with air; and when the pressure of wind from the bottom bellows is stopped, the weight in its descent closes the outer valves of the self-filling reservoirs, and presses the wind out of the same into the wind chest, and forces it through four or more wind or faucet pipes, arranged on each side, and communicating with the fires to be operated upon—each of the beforementioned reservoirs or bellows being provided with suitable swinging valves, for regulating the ingress and egress of the wind.

To enable others skilled in the art to make and use my invention, I will proceed to describe its construction and operation.

I construct my improved apparatus with one or two bellows A, at the bottom, and a wind chest above B, provided with the usual appendages; and in order to increase the quantity of wind, without increasing the labor expended in operating the machine, I apply two self-filling reservoirs, or upright bellows C C, one on each side of the wind chest, and forming the sides of the same. I make these reservoirs three feet six inches high, and the same width, rounded at the top, and provided with a valve D of the usual form, on the inside of the vibrating side, and near the top of the same, for admitting and retaining the wind, in said reservoirs, during their operation.

The wind chest B, is made one foot wide, one foot, ten inches high (extreme) and three feet long, inside, and has two valves E, E, on its bottom, for opening and closing communication with the lower bellows, or reservoirs A, which are arranged immediately below the wind chest. They are made five feet long, and three feet six inches wide, and rounded at their ends, being connected or jointed by leather hinges at the opposite ends, of their lower or vibrating parts, to a vertical division board F, secured to the bottom of the wind chest, and provided with valves G, G, similar to those attached to the upright bellows or reservoirs at D. The ends of said vibrating bottom planks, of the reservoir or bellows, are hinged to the girt F by means of a strap, fastened to said girt, and the bottom of the lower vibrating planks, in such a manner as to allow said bellows to spread or open 2 feet.

The vibrating side pieces of the upright reservoirs C, are attached to the longitudinal girts *g g* in a similar manner, so that when the weight H, on the leather top of the wind chest B, is raised, by the pressure of the wind from the bottom bellows, they will by their own gravity fall open, and inclose or take in a large quantity of wind, while the bottom bellows are filling.

The faucet pipes I are made of plank, or hard square timber, three inches thick or square, perforated with an opening K bored in the same, and extending from the outer to the inner end, when they are secured to, and communicate with, the wind chest B. These openings are made to taper from the inner end, as represented in Fig. 4, and are provided with faucets or cocks L for shutting off, or opening the communication between the wind chests and fires, to which they conduct, by means of cast iron or other pipes, attached to their outer ends.

The movable parts of the lower bellows are suspended to the ends of vibrating levers M secured on the ends of longitudinal rock shafts N, arranged between the inner, or stationary sides, of the upright reservoirs, or bellows c, by means of upright rods o, hooked to the ends of said levers, and extending to perforated metallic plates P, fastened to said movable parts, of the lower bellows, to which they are also attached, by being passed through openings in the same, and bent at their ends below, to form a head, in such a manner that said iron plate P, will slide upward on the rods and allow one of the longitudinal timbers N, to remain stationary, while the other is in motion.

The leather, forming the top of the wind chest, and to which the weight H, is attached, is secured to the insides of the chest, as represented in Figs. 2 and 3, and is sufficiently large, in proportion to the size of the chest, as to allow it to be expanded sufficiently, by the pressure of the wind from the lower bellows, to raise the weight, the required distance. The weight may be placed in a box of a corresponding form, nailed or otherwise secured at its lower end to the leather, forming the top of the wind chest.

The operation of this improved bellows is as follows: The faucet pipes I, on the sides of the same, being connected to the ends of cast iron pipes, extending to the fires and the faucets or cocks L, opened, the operator pulls the end of the lever M, down, after the manner of the lever of the ordinary bellows, which causes the lower bellows A, to contract, and force the wind out of the same, through openings o in the wind chest, and causes the leather, forming the top of the same, to raise, carrying with it the weight H above it, which slackens the leather straps, attached to the upright post or standard U of the weight H, and extending over pulleys T and attached to the outsides of the upright reservoirs, C, and allow said sides to open, by their own gravity, and the reservoirs to be filled with wind. The operator then releases the lever M, which allows the movable jaws of the lower bellows to lower, to their original position, and again become filled with wind—the weight also descends at the same time, and closes the outside planks, of the upright reservoirs, which forces the wind confined in them through openings p near their lower ends into the wind chest B, from which it is forced, by the descent of the weight, through the faucet pipes I, to the fires to be blown.

What I claim as my invention and improvement and which I desire to secure by Letters Patent in the before described blacksmiths' bellows is—

Combining with the double bellows A A and air chamber B, the two side bellows C C, arranged and operating in the manner and for the purpose above set forth; or other mode substantially the same.

MORGAN LOOMIS.

Witnesses:
 Wm. P. Elliot,
 A. E. H. Johnson.